United States Patent [19]
Guba

[11] 4,007,728
[45] Feb. 15, 1977

[54] SOLAR COLLECTOR
[76] Inventor: Peter Guba, 786 Malibu Lane, Indialantic, Fla. 32903
[22] Filed: Jan. 6, 1975
[21] Appl. No.: 538,912
[52] U.S. Cl. .............................................. 126/271
[51] Int. Cl.² ......................................... F24J 3/02
[58] Field of Search ............ 126/270, 271; 165/49, 165/170

[56] References Cited
UNITED STATES PATENTS

| | | | |
|---|---|---|---|
| 695,136 | 3/1902 | Baker | 126/271 |
| 2,998,006 | 8/1961 | Johnston | 126/271 |
| 3,229,682 | 1/1966 | Perlmutter et al. | 126/270 |
| 3,232,795 | 2/1966 | Gillette et al. | 126/270 |
| 3,684,007 | 8/1972 | Ragi | 165/133 |
| 3,884,217 | 5/1975 | Wartes | 126/270 |

FOREIGN PATENTS OR APPLICATIONS 811,015  1/1937  France ................. 126/271

Primary Examiner—Lloyd L. King
Attorney, Agent, or Firm—Duckworth, Hobby, Orman, Allen & Pettis

[57] ABSTRACT

Apparatus for collecting heat of radiation includes a hollow member having a panel with a substantially flat exterior surface, the panel absorbing radiation incident to the surface and transferring the heat therefrom to a fluid passing through the member. A reflector body extends from the surface, and is adapted to reflect radiation incident thereto toward the radiation-absorbing surface.

11 Claims, 2 Drawing Figures

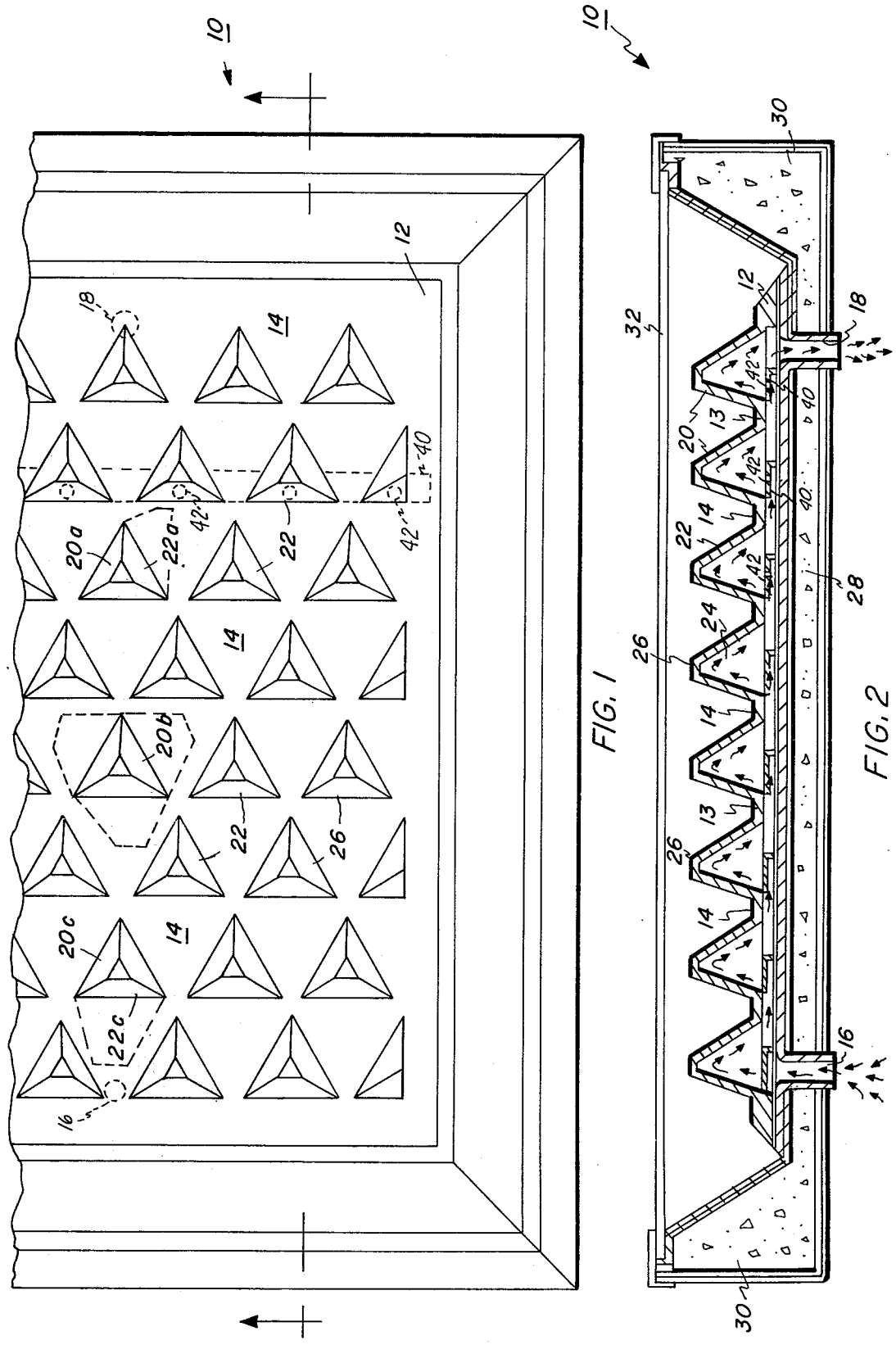

SOLAR COLLECTOR

BACKGROUND OF THE INVENTION

1. Field of the Invention

The present invention relates to devices which collect solar radiation for purposes of heating a fluid, such as water.

2. Description of the Prior Art

The prior art contains numerous suggestions of flat panel solar collectors which are useful for heating water or other fluids. One type of such solar collectors employ a circuitous conduit of a good heat conducting material, such as copper, which is disposed on a flat, heat-absorbing panel. This arrangement is disposed in areas of high solar radiation, in order to heat water passing through the conduit. Alternatively, other fluids useful for transferring the heat absorbed from solar radiation into a building for other purposes may be utilized. Examples of such collectors are described by Yellott at page 31 of the December, 1973 ASHRAE JOURNAL.

A variety of other flat panel arrangements have been employed for special purposes. In U.S. Pat. No. 3,232,795, Gillette et al disclose a solar cell converter useful for space vehicles and in similar applications. Perlmutter et al, in U.S. Pat. No. 3,229,682, disclose a device for directionally controlling electromagnetic radiation. As disclosed by Perlmutter et al, this device includes a plurality of radiation-reflecting surfaces which increase the intensity of the radiation directed to a thermal energy transferring element.

Other prior art patents of interest include: U.S. Pat. Nos. 980,505 to Emmet; Pat. No. 3,089,670 to Johnson; 2,969,788 to Newton; Pat. No. 3,613,659 to Phillips; and 3,285,333 to Johnson.

SUMMARY OF THE INVENTION

The present invention contemplates apparatus for collecting heat of radiation comprising a hollow member having a panel with a substantially flat exterior surface, the panel being capable of absorbing radiation incident to the surface and transferring the heat therefrom to a fluid passing through the member. A reflector body extends away from the flat surface, the reflector body adapted to reflect radiation incident thereto toward the flat surface of the panel.

In a preferred embodiment, the reflector body has a hollow interior communicating with the interior of the hollow member, such that fluid circulating through the hollow member likewise circulates through the interior of the reflector body. Further in accordance with this preferred embodiment, each reflector body is tapered in a direction away from the flat surface of the panel, the extremity of each tapered reflector body distal to the flat surface being defined by a level surface which is likewise absorptive of radiation in the same manner as the flat surface of the panel.

THE DRAWING

FIG. 1 is top plan view, partially cut away, of a solar collector in accordance with the present invention.

FIG. 2 is a cross-sectional side view of the embodiment of FIG. 1, taken along the lines 2–2'.

DETAILED DESCRIPTION

A preferred embodiment of the solar collector in accordance with the present invention will now be described with reference to FIGS. 1 and 2.

The collector, referred to generally as 10, comprises a member 12 having a hollow interior therein. The hollow member 12 includes a panel 13 having an exterior flat surface 14 which is preferably coated with a heat-absorbing material, such as a flat, black paint, so as to render that surface relatively heat absorbing with respect to the reflective surfaces 22 of the reflector body 20, as is described in greater detail below.

The hollow member 12 further includes an input and output 16 and 18, respectively, both of which communicate with the hollow interior of the member 12 such that a fluid flowing through the input is capable of circulating through the member 12 and thence through the output 18 (note arrows in FIG. 2).

In accordance with the present invention, a plurality of hollow reflector bodies 20 are provided, each reflector body having a hollow interior communicating with the hollow interior of the member 12 and tapering inward in a direction away from the flat surface 14. As shown in FIG. 1, each reflector body 20 may comprise a trianguloid; however, it will be understood by those skilled in the art that a variety of other geometric shapes may be employed without departing from the spirit and scope of the present invention. The extremity of each reflector body 20 comprises a plane surface 26 which is preferably substantially parallel with the flat surface 14, and includes a heat-absorbing material, such as a layer of flat, black paint, so as to heat water circulating therein. As shown in FIG. 2, each reflector body 20 includes a hollow interior which communicates with the hollow interior of the member 12. The panel 13 and reflector bodies 20 may be formed from an integral sheet by conventional stamping or molding processes.

The collector 10 further includes a base 28 which carries the hollow member 12, and through which extends the input and output 18 and 20, respectively. The base 28 includes supporting sides 30, the base 28 and sides 30 being formed of a material which is relatively heat resistant with respect to the member 12, in order that little or no heat is lost through this material.

The collector 10 further includes a cover 32 which is transparent to solar radiation, in order that the heat of radiation falls onto the reflector surfaces 22 of the reflector bodies 20 and the flat surface 14. The cover 32 is supported by the sides 30, as is shown in FIG. 2.

Noting both FIGS. 1 and 2, the collector 10 is provided with brackets 40, each of which extend through the hollow interior of the member 12 along a column of the reflector bodies 20. Each bracket 40 includes a plurality of apertures 42, each aperture being positioned at the front of the corresponding reflector body 20 so as to direct fluid upward into the hollow interior of the reflector body.

The manner in which the collector 10 functions will now be described. The collector 10 is positioned on a roof, or against the wall of a building so as to be exposed to solar radiation during the course of the day. It will likewise be understood that the collector 10 may be permanently inplaced in conjunction with the building.

As with prior art flat-plate solar collectors of the type described above, the black-coated flat surface 14 absorbs incident solar radiation, the heat of which passes through the panel 13 to heat water, or any other fluid, passing through the hollow interior of the member 12. Now noting a first one of the reflector bodies 20a in the right hand portion of FIG. 1, during those periods when the angle of incidence of the sun's rays are relatively shallow, one of the reflecting surfaces 22a reflects the low-angle solar radiation onto the flat surface 14 in order to achieve the desired heat absorption (reflected radiation is defined by dotted lines).

Now noting a second one of the reflector bodies 20b in the central portion of FIG. 1, during those periods when solar radiation is substantially perpendicular to the flat surface 14, a substantial portion of all of the reflective surfaces of the reflector body 20b reflect the solar radiation onto the flat surface 14. Now noting a third one of the reflector bodies 20c at the left hand portion of FIG. 1, as the rotation of the earth changes the relative position of the sun during any given day, another reflective surface 22b receives the solar radiation at low angles of incidence on the opposite side of the collector 10, and reflect this radiation onto the flat surface 14 in order to heat the water passing through the member 12. In this way, the reflector bodies 20 serve to increase the efficiency of a flat collector, by increasing the amount of solar energy during periods of low angles of incidence of solar radiation. The relatively high heat resistive base 28 prevents heat transfer from the water, during periods when the water is circulating through the member 12. The cover 32 assists in providing a "greenhouse effect", by trapping heated air between the member 12 and the cover, to further increase the efficiency of heat absorption at the flat surface 14 and through the panel 13. As the water leaves the output 18, it may be pumped into a water storage tank. Alternatively, other fluids may be heated as described above for utilizing that heat for performing other work functions.

An important aspect of the collector of the present invention is the increased efficiency for a flat panel collector, which allows smaller absorption areas to be employed. Further, as described above the reflector bodies may take numerous shapes, and provide a decorative appearance to the collector.

Additionally, the use of the flow-directing bracket 40 provides increased efficiency with respect to the transfer of heat to the fluid flowing therethrough.

I claim:

1. Apparatus for collecting heat of radiation comprising:

a hollow member having a panel with a substantially flat exterior surface, said panel capable of absorbing radiation incident to said surface and transferring heat from said radiation to a fluid passing through said member;

a reflector body extending from said surface, said body having an exterior surface for reflecting radiation incident thereto towards said flat surface of said panel;

said reflector body having a hollow interior immediately above the interior of said hollow member; and means directing said fluid into the reflector body wherein said fluid circulating through said hollow member likewise circulates through the interior of said reflector body.

2. Apparatus as recited in claim 1 further comprising a base member supporting said hollow member, said base member being heat resistant relative to said hollow member.

3. Apparatus as recited in claim 2 further comprising a cover disposed over said surface and said reflector body, said cover being transparent to said radiation.

4. Apparatus as recited in claim 3 wherein said cover is substantially parallel with said flat surface.

5. Apparatus as recited in claim 4 wherein said base member includes supporting sides carrying said cover.

6. Apparatus as recited in claim 5 further comprising a plurality of reflector bodies like said first reflector body, said reflector bodies disposed across said flat surface.

7. Apparatus as recited in claim 6 wherein each said reflector body is tapered in a direction away from said flat surface, the extremity of each tapered reflector body distal to said flat surface being defined by a level surface.

8. Apparatus as recited in claim 7 wherein said level surface is substantially parallel with said flat surface.

9. Apparatus as recited in claim 7 wherein said level surface of said reflector body is absorptive of said radiation with respect to said reflective exterior surface thereof.

10. Apparatus as recited in claim 1 further comprising means for directing fluid flow into said hollow interior of said reflector body.

11. Apparatus as recited in claim 10 wherein said directing means comprises a bracket in said hollow member and having an aperture therethrough communicating with said hollow interior of said reflector body.

* * * * *